(12) United States Patent
Yang

(10) Patent No.: US 8,955,534 B2
(45) Date of Patent: Feb. 17, 2015

(54) PAINT SUPPLYING PAIL WITH WIND DIRECTION DEFLECTOR AND QUICK OPEN-CLOSE STRUCTURE

(76) Inventor: Li-Chin Yang, Taichung (TW)

(*) Notice: Subject to any disclaimer, the term of this patent is extended or adjusted under 35 U.S.C. 154(b) by 205 days.

(21) Appl. No.: 13/823,025

(22) PCT Filed: Jan. 14, 2011

(86) PCT No.: PCT/CN2011/070289
§ 371 (c)(1),
(2), (4) Date: Mar. 13, 2013

(87) PCT Pub. No.: WO2012/094828
PCT Pub. Date: Jul. 19, 2012

(65) Prior Publication Data
US 2013/0167946 A1      Jul. 4, 2013

(51) Int. Cl.
| B67D 7/72 | (2010.01) |
| F17D 1/08 | (2006.01) |
| B05B 9/04 | (2006.01) |
| F16J 13/04 | (2006.01) |
| B05B 7/24 | (2006.01) |
| B05B 9/08 | (2006.01) |

(52) U.S. Cl.
CPC ... *F17D 1/08* (2013.01); *B05B 9/04* (2013.01); *F16J 13/04* (2013.01); *B05B 7/2494* (2013.01); *B05B 9/0811* (2013.01)
USPC .......................................... 137/209; 137/206

(58) Field of Classification Search
USPC ....................... 137/209; 73/323; 220/239, 222
See application file for complete search history.

(56) References Cited

U.S. PATENT DOCUMENTS

| 867,470 | A | * | 10/1907 | Bourne ............................ 137/209 |
| 1,792,027 | A | * | 2/1931 | Parker ................................ 417/33 |
| 2,051,518 | A | * | 8/1936 | Cunningham .................. 222/325 |
| 2,270,457 | A | * | 1/1942 | Martin ............................ 356/414 |
| 2,318,066 | A | * | 5/1943 | Dodd ................................. 417/5 |
| 2,608,439 | A | * | 8/1952 | Bates et al. .................... 137/206 |
| 2,622,770 | A | * | 12/1952 | Penno ........................... 222/464.1 |
| 2,764,177 | A | * | 9/1956 | Paasche ......................... 137/209 |
| 3,870,069 | A | * | 3/1975 | Etter ............................... 137/209 |
| 4,307,820 | A | | 12/1981 | Binoche |
| 4,824,018 | A | | 4/1989 | Shreve |
| 5,005,601 | A | * | 4/1991 | Strong ......................... 137/205.5 |
| 6,223,997 | B1 | * | 5/2001 | Fulkerson et al. ............. 239/112 |
| 7,610,807 | B2 | * | 11/2009 | Skinner ............................ 73/319 |
| 2005/0105388 | A1 | * | 5/2005 | Fischman et al. ............. 366/247 |

FOREIGN PATENT DOCUMENTS

| CN | 2409163 | 12/2000 |
| CN | 2843631 | 12/2006 |
| CN | 201482628 | 5/2010 |

* cited by examiner

*Primary Examiner* — John Rivell
*Assistant Examiner* — Umashankar Venkatesan
(74) *Attorney, Agent, or Firm* — Ming Chow; Sinorica, LLC

(57) ABSTRACT

A paint supplying pail comprises a paint supplying pail body, a paint supplying pail cover, a quickly detachable rod, a fastening member and a deflecting block. The paint supplying pail body has at least one protruding pole and is covered by the paint supplying pail cover which is provided outwardly with a vertical pole. The quickly detachable rod is rotatably sleeved on the vertical pole, and the fastening member is overlapped on the quickly detachable rod. The fastening member comprises at least one transverse groove which moves transversely to sleeve on the protruding pole, and the quickly detachable rod rotates to lift the fastening member, thereby the transverse groove pressing against the protruding pole. The deflecting block is wedged into an air deflecting pipe of the pant supplying pail cover, and perforated to have a non-through venting passage and two air holes.

6 Claims, 6 Drawing Sheets

PAINT SUPPLYING PAIL WITH WIND DIRECTION DEFLECTOR AND QUICK OPEN-CLOSE STRUCTURE

FIELD OF THE INVENTION

The present invention relates to a paint supplying pail and particularly to a paint supplying pail with wind direction deflector and quick open-close structure.

BACKGROUND OF THE INVENTION

Please refer to FIG. 1, a conventional paint supplying pail includes a pail body 1 and an upper cover 2. The pail body 1 holds paint inside (not shown in the drawing) and has a paint ejection port 3. The upper cover 2 has an air intake port 4, a regulation valve 5 and a pressure gauge 6. The air intake port 4 can be connected to an air compressor (not shown in the drawing). The air compressor generates high pressure air sent into the pail body 1. The paint ejection port 3 is connected to a spray gun (not shown in the drawing). When the spray gun is opened the high pressure air forces the paint to eject out through the paint ejection port 3 to perform painting operation desired. Such an approach can replace the traditional time-consuming and tedious manual painting operation, hence can reduce operation cost.

When the paint contained in the conventional paint supplying pail is depleted and replenishment is required, users have to unfasten a fastener 7 to remove the upper cover 2 from the pail body 1. It is a tedious and troublesome task. Moreover, when the fastener 7 is wrenched for unfastening the air intake port 4, regulation valve 5 and pressure gauge 6 on the upper cover 2 could be easily impacted by external forces and damaged. In addition, when the high pressure air passes through the air intake port 4 a high speed airflow is generated that could hit the paint held in the pail body 1 and result in spattering the paint to the bottom of the upper cover 2 and cause waste of the paint. In short, the conventional technique still leaves a lot to be desired, such as tedious and troublesome operation of unfastening the upper cover 2 during replenishment of the paint, easy damage of the paint supplying pail and waste of the paint, and cannot fully meet use requirements.

SUMMARY OF THE INVENTION

Therefore, the primary object of the present invention is to provide a paint supplying pail with a cover that can be opened and closed quickly.

To achieve the foregoing object, the present invention provides a paint supplying pail with wind direction deflector and quick open-close structure. The paint supplying pail comprises a paint supplying pail body, a paint applying pail cover, a quickly detachable rod, a fastening member and a deflecting block. The paint supplying pail body has a housing chamber with an opening and at least one protruding pole outside the housing chamber. The paint supplying pail cover covers the opening and has a vertical pole provided outwardly. The vertical pole has a cylindrical surface at the bottom and a non-cylindrical surface connecting to the cylindrical surface at the upper side. The paint supplying pail cover also has an air deflecting pipe extended into the housing chamber and run through the vertical pole.

In addition, the quickly detachable rod has an inner circular surface against the cylindrical surface for coupling thereon. The fastening member also has an inner non-circular surface against the non-cylindrical surface for coupling thereon and overlapping on the quickly detachable rod. The quickly detachable rod and fastening member have respectively a slopping top surface in contact with each other. The fastening member has at least one transverse groove movable transversely to couple with the protruding pole such that the quickly detachable rod can be rotated to lift the fastening member upwards to allow the transverse groove to press against the protruding pole. Furthermore, the deflecting block is wedged into an air deflecting pipe of the paint supplying pail cover and has a non-through venting passage perforated downwardly from the top thereof and two air holes perforated from the bottom of the non-through venting passage towards two opposite sides in the lateral direction to communicate with the interior of the paint supplying pail body.

In one aspect of the invention the paint supplying pail body has a communicating duct on an outer side with two ends communicating with the housing chamber.

In another aspect the paint supplying pail body has a discharge port, and the air deflecting pipe is connected to an air intake device which includes a regulation valve, a pressure gauge and an air intake port.

In yet another aspect the paint supplying pail cover has a plurality of retaining flanges to latch on the fastening member.

In yet another aspect the paint supplying pail body includes two protruding poles at two opposite sides thereof.

In yet another aspect the inner non-circular surface of the fastening member is a rectangular surface, and the non-circular surface of the vertical pole is a rectangular surface.

Thus, the quickly detachable rod can rotated to control the tight pressing between the transverse groove and protruding pole, i.e., when the transverse groove presses against the protruding pole, the paint supplying pail cover is pressed by the quickly detachable rod to tightly cover the opening; however, when the transverse groove does not press against the protruding pole, the transverse groove can easily separate from the protruding pole so that the paint supplying pail cover can be easily removed from the paint supplying pail body, thereby to form a quick open-close paint supplying pail through moving the quickly detachable rod. Moreover, by injecting high pressure air through the air deflecting pipe a pressure clump can be formed inside the paint supplying pail body near the paint supplying pail cover to prevent spattering of the paint to the paint supplying pail cover to avoid waste of the paint.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
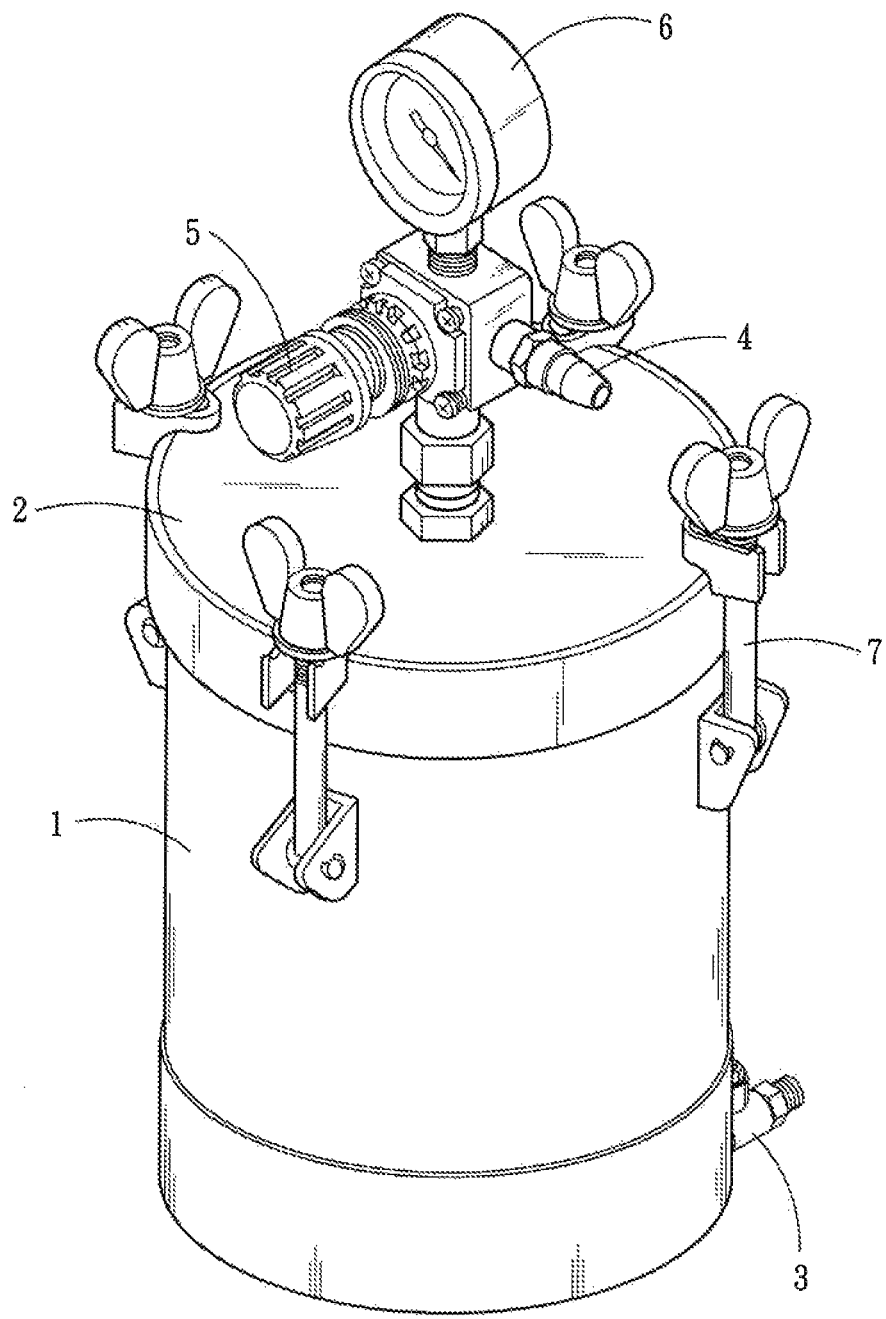
FIG. 1 is a schematic view of a conventional paint supplying pail.
Figure 2:
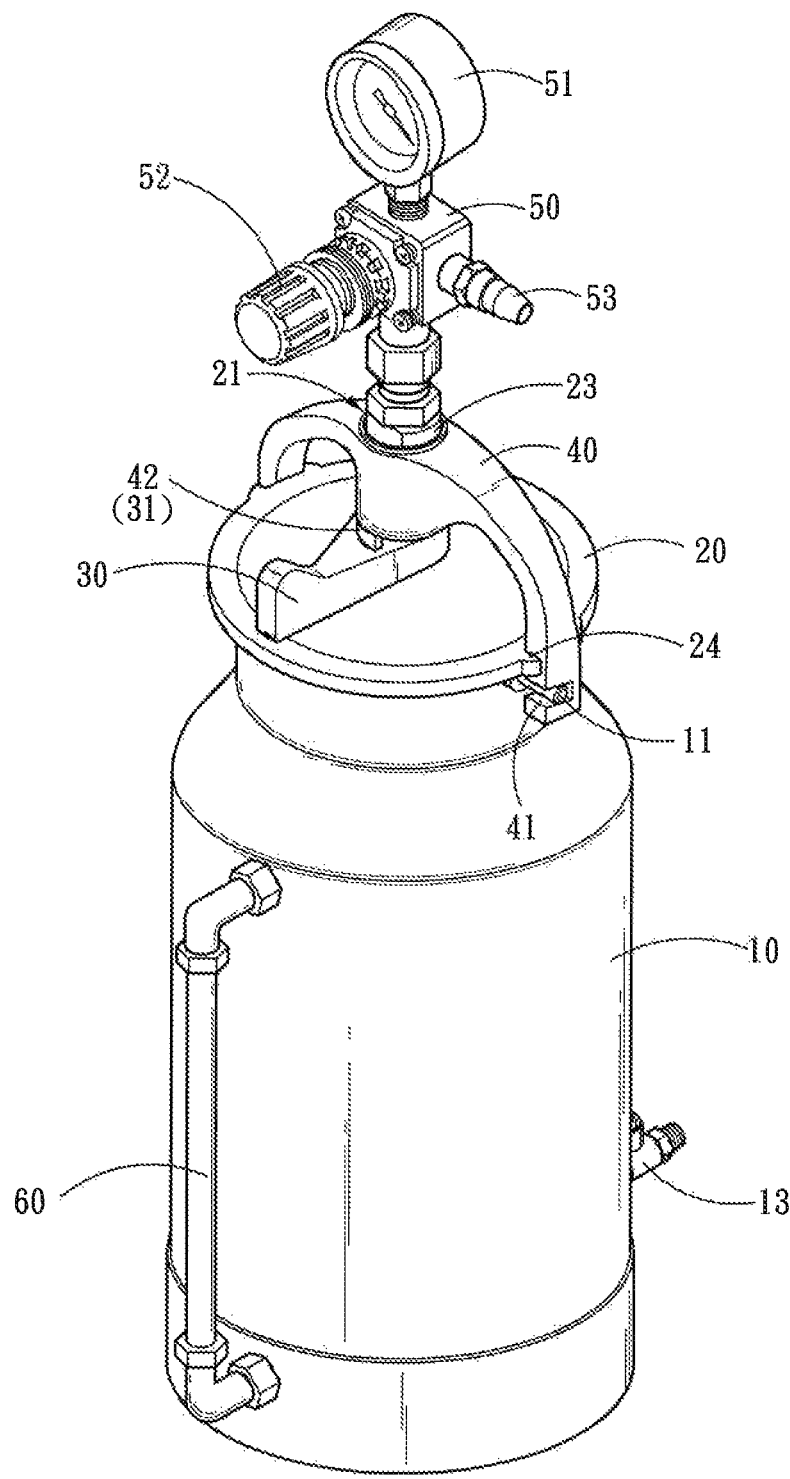
FIG. 2 is a perspective view of the invention.
Figure 3:
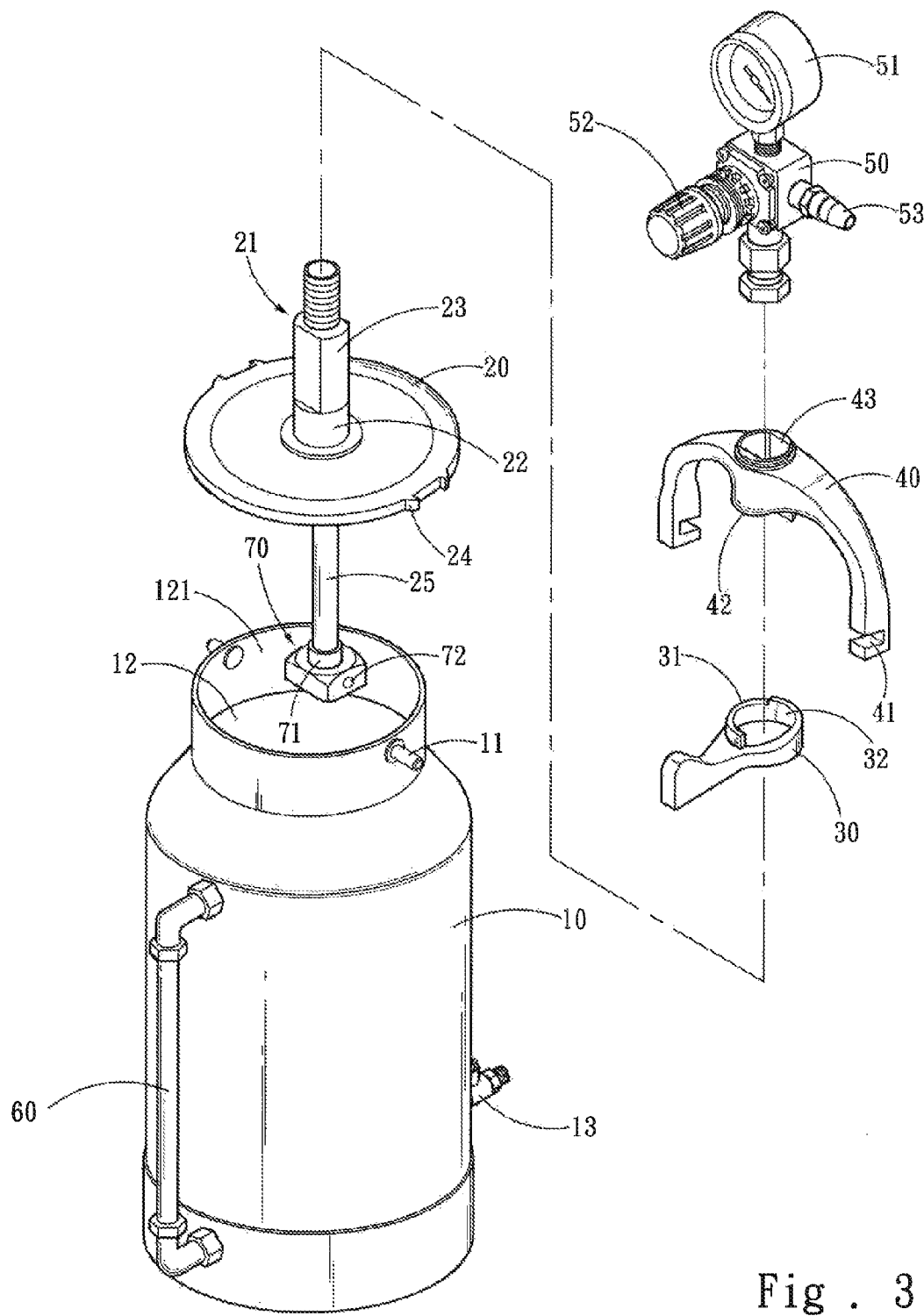
FIG. 3 is an exploded view of the invention.

Please refer to FIGS. 2 and 3, the present invention aims to provide a paint supplying pail with wind direction deflector and quick open-close structure. It comprises a paint supplying pail body 10, a paint applying pail cover 20, a quickly detachable rod 30, a fastening member 40 and a deflecting block 70. The paint supplying pail body 10 has a housing chamber 12 with an opening 121 and at least one protruding pole 11 outside the housing chamber 12. The number of the protruding pole 11 can be two at two opposite sides of the paint supplying pail body 10.

The paint supplying pail cover 20 covers the opening 121 and has a vertical pole 21 provided outwardly. The vertical pole 21 has a cylindrical surface 22 at the bottom and a non-cylindrical surface 23 connecting to the cylindrical surface 22 at the upper side. The quickly detachable rod 30 has an inner circular surface 32 against the cylindrical surface 22 for coupling thereon. The fastening member 40 has an inner non-circular surface 43 against the non-cylindrical surface 23 for coupling thereon and overlapping on the quickly detachable rod 30. The inner non-circular surface 43 can be, but not limited to, a rectangular surface. The non-cylindrical surface 23 can be, but not limited to, a rectangular surface. The paint supplying pail cover 20 also can have a plurality of retaining flanges 24 to latch on the fastening member 40 so that when the fastening member 40 is rotated the paint supplying pail cover 20 is driven at the same time.

The quickly detachable rod 30 and fastening member 40 have respectively a slopping top surface 31 and 42 in contact with each other. The fastening member 40 has at least one transverse groove 41 movable transversely to couple with the protruding pole 11. The quickly detachable rod 30 can be rotated to lift the fastening member 40 upwards to allow the transverse groove 41 to press against the protruding pole 11.

Furthermore, the paint supplying pail body 10 has a communicating duct 60 on the outer side with two ends leading to the housing chamber 12. The communicating duct 60 can indicate the amount of paint in the housing chamber 12. The paint supplying pail body 10 also has a discharge port 13. The paint supplying pail cover 20 has an air deflecting pipe 25 extended into the housing chamber 12 and run through the vertical pole 21 to connect to an air intake device 50. The air intake device 50 includes a regulation valve 52, a pressure gauge 51 and an air intake port 53. The deflecting block 70 is wedged into the air deflecting pipe 25 and has a non-through venting passage 71 performed downwardly from the top thereof and two air holes 72 perforated from the bottom of the non-through venting passage 71 towards two opposite sides in the lateral direction to communicate with the interior of the paint supplying pail body 10.

Figure 4:
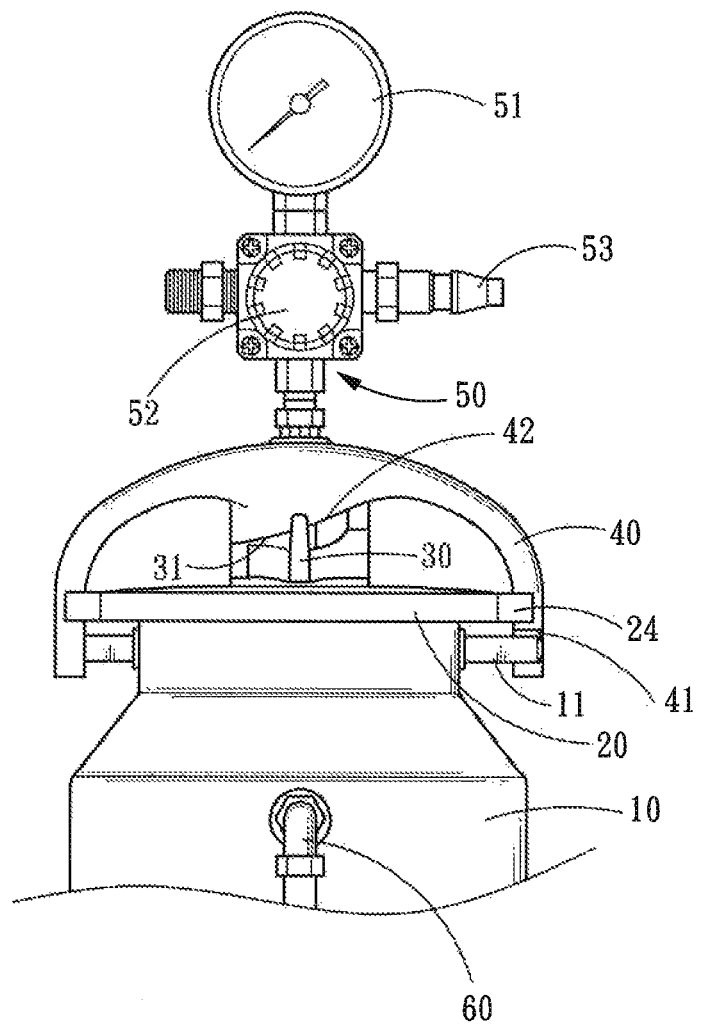
FIG. 4 is a schematic view of the invention showing open and closed operatingcondition-1.
Figure 5:
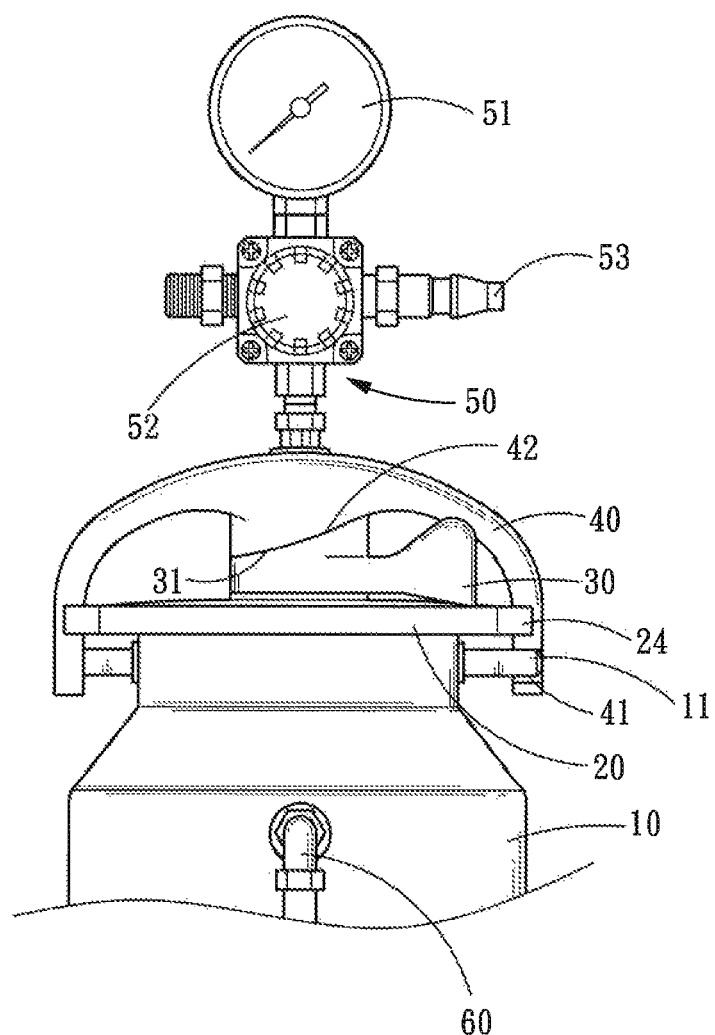
FIG. 5 is a schematic view of the invention showing open and closed operatingcondition-2.
Figure 6:
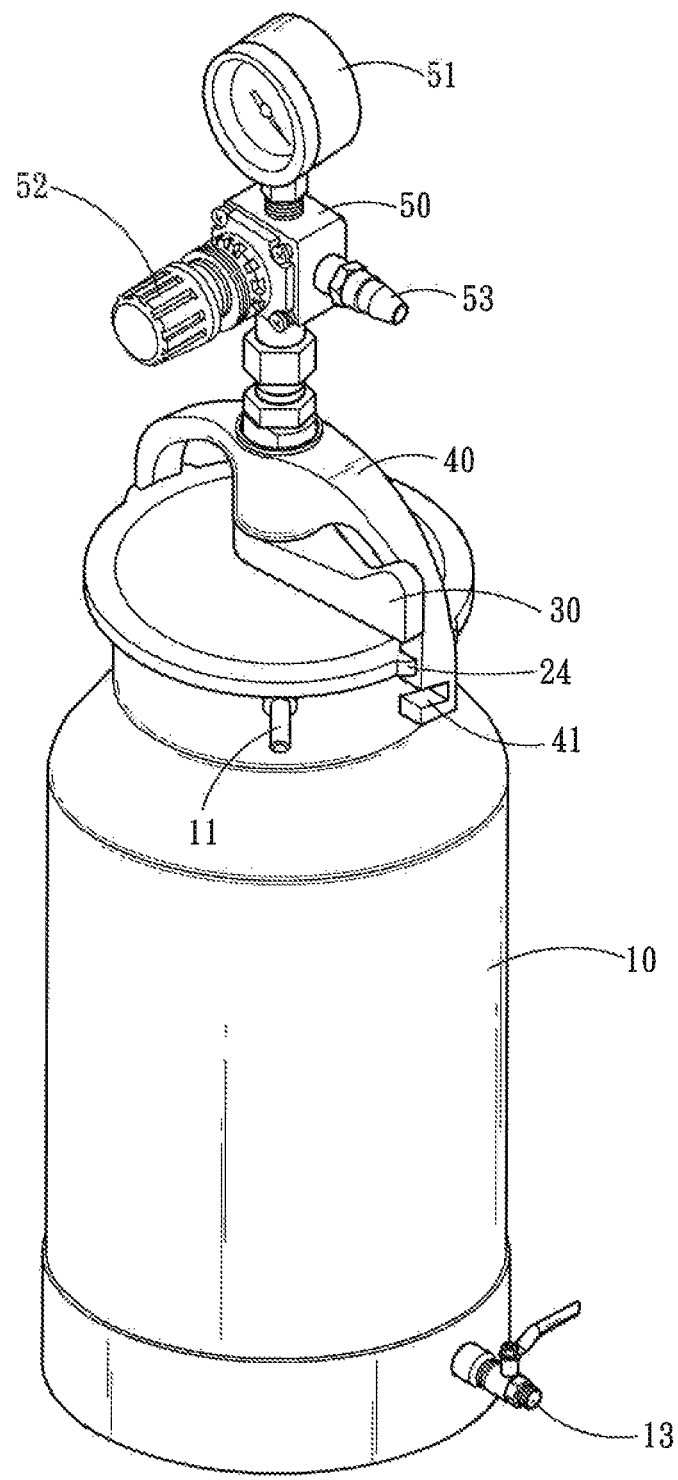
FIG. 6 is a schematic view of the invention showing open and closed operatingcondition-3.

Please also refer to FIGS. 4, 5 and 6 for the invention in use conditions. In FIG. 4, the quickly detachable rod 30 is rotated to lift the fastening member 40 upwards to allow the transverse groove 41 to press against the protruding pole 11, and the paint supplying pail cover 20 is pressed by the quickly detachable rod 30 to tightly cover the opening 121. In FIG. 5, the quickly detachable rod 30 is rotated to change the elevation of the fastening member 40, and the transverse groove 41 does not press against the protruding pole 11 anymore. Thus, as shown in FIG. 6, the fastening member 40 can be rotated to move the transverse groove 41 away from the protruding pole 11, and the paint supplying pail cover 20 can be directly removed from the paint supplying pail body 10.

As a conclusion, the invention can easily change the elevation of the fastening member 40 by rotating the quickly detachable rod 30, thereby the transverse groove 41 can be formed in two conditions of tightly pressing against the protruding pole 11 and not tightly pressing against the protruding pole 11. In the condition of tightly pressing against the protruding pole 11 by the transverse groove 41, the paint supplying pail cover 20 can tightly cover the opening 121; in the condition of not tightly pressing against the protruding pole 11 by the transverse groove 41, the fastening member 40 can be rotated to move the transverse groove 41 away from the protruding pole 11, and the paint supplying pail cover 20 can be directly removed from the paint supplying pail body 10. In addition, high pressure air can be injected into the paint supplying pail body 10 through the air deflecting pipe 25 to form a pressure clump inside the paint supplying pail body 10 near the paint supplying pail cover 20 to avoid waste of the paint. As a result, the paint supplying pail with wind direction deflector and quick open-close structure of the invention can better meet users' requirements.

What is claimed is:

1. A paint supplying pail with wind direction deflector and quick open-close structure, comprising:
    a paint supplying pail body including a housing chamber with an opening and at least one protruding pole outside the housing chamber;
    a paint supplying pail cover which covers the opening and includes a vertical pole provided outwardly, the vertical pole including a cylindrical surface at the bottom and a non-cylindrical surface connecting to the cylindrical surface at an upper side, the paint supplying pail cover including an air deflecting pipe extended into the housing chamber and run through the vertical pole;
    a quickly detachable rod including an inner circular surface against the cylindrical surface of the vertical pole for coupling thereon;
    a fastening member including an inner non-circular surface against the non-cylindrical surface for coupling thereon and overlapping on the quickly detachable rod; the quickly detachable rod and the fastening member including respectively a slopping top surface in contact with each other, the fastening member including at least one transverse groove movable transversely to couple with the protruding pole such that the quickly detachable rod is rotatable to lift the fastening member upwards to allow the transverse groove to press against the protruding pole; and
    a deflecting block which is wedged into the air deflecting pipe and includes a non-through venting passage perforated downwardly from the top and two air holes perforated from the bottom of the non-through venting passage towards two opposite sides in the lateral direction to communicate with the interior of the paint supplying pail body.

2. The paint supplying pail with the wind direction deflector and the quick open-close structure of claim 1, wherein the paint supplying pail body includes a communicating duct on an outer side with two ends leading to the housing chamber.

3. The paint supplying pail with the wind direction deflector and the quick open-close structure of claim 1, wherein the paint supplying pail body includes a discharge port, the air deflecting pipe being connected to an air intake device which includes a regulation valve, a pressure gauge and an air intake port.

4. The paint supplying pail with the wind direction deflector and the quick open-close structure of claim 1, wherein the paint supplying pail cover includes a plurality of retaining flanges to latch on the fastening member.

5. The paint supplying pail with the wind direction deflector and the quick open-close structure of claim 1, wherein the paint supplying pail body includes two protruding poles at two opposite sides thereof.

6. The paint supplying pail with the wind direction deflector and the quick open-close structure of claim 1, wherein the inner non-circular surface of the fastening member is a rectangular surface and the non-cylindrical surface of the vertical pole is a rectangular surface.

* * * * *